3,309,424
METHYL METHACRYLATE SYRUP COMPOSITION CONTAINING POLY-α-METHYL STYRENE
Hitoshi Abe and Kiyokazu Imai, Kurashiki, Japan, assignors to Kurashiki Rayon Company, Limited, Kurashiki, Japan, a corporation of Japan
No Drawing. Filed May 11, 1964, Ser. No. 366,613
Claims priority, application Japan, May 23, 1963, 38/26,932; July 25, 1963, 38/39,484; July 26, 1963, 38/39,642
6 Claims. (Cl. 260—885)

The present invention relates to a new methyl methacrylate syrup composition containing a suitable polymers and monomers, and more particularly, the invention is concerned with a methyl methacrylate syrup consisting of α-methylstyrene polymer (means a single polymer or copolymer of α-methylstyrene) and methyl methacrylate monomer.

The syrup composition of the invention is useful as a material for making shaped articles and laminated products.

The manufacture of methyl methacrylate syrup having desired viscosity and improved stability for storage has been a problem of great importance in the industry of methacrylate resin production.

The principal object of the invention is therefore to provide a methacrylate syrup having a commercially useful viscosity and improved stability for storage and having at the same time a sufficient high polymer concentration without adversely influencing against the quality of products made therefrom upon use in manufacturing shaped articles and laminated products possessing excellent properties.

Another object is to provide a stable methacrylate syrup having a controlled polymerization rate upon shaping or laminating process and having a relatively low exothermic nature as well as a small shrinking nature.

A syrup having low exothermic and less shrinking properties is useful in shaping (molding) or laminating process. The comparatively low exothermic nature of the syrup of the invention is due to the small polymerization heat of the monomer contained therein and such syrup can be obtained by increasing the polymer content, i.e. by increasing the ratio of the polymer to the monomer. Increase in the polymer content will also give reduced contractibility. By adding to the syrup a compound having appropriate polymerization retarding activity, violent evolution of polymerization heat which is often encountered in the polymerization of a conventional methacrylate syrup can be moderated to gradual evolution of polymerization heat which eliminates the troubles in forming or laminating process.

The new composition of methacrylate syrup of the invention attaining the above objects is so regulated as to have a viscosity of 0.1–50 poises at 25° C. by dissolving a poly-α-methylstyrene homopolymer or a mixture of polymers consisting of mainly poly-α-methylstyrene is a methyl methacrylate monomer or in a mixture of monomers consisting of mainly methyl methacrylate momomer.

The total content polymers, however, including α-methylstyrene polymer in the syrup of the invention is preferably less than 70 weight percent from the point of various objects and merits brought about by the invention.

The α-methylstyrene polymers to be used in the invention may be obtained by cationic polymerization, anionic polymerization, coordinated polymerization, or radial polymerization processes.

When poly-α-methylstyrene is used together with other polymer, the combination of such polymer can be properly selected in order to modify the properties of syrup or shaped articles and laminated products. In the syrup of the invention, when methyl methacrylate monomer is used with other polymerizable monomer such as α-methylstyrene, styrene, ethyl acrylate, or allyl methacrylate, itaconic acid and derivatives thereof, diallyl phthalate, diallyl cyanurate derivatives, triallyl cyanurate, diallyl melamine or derivatives thereof, triallyl ketonate, diallylamide methacrylate, diallylester of maleic acid or fumaric acid, the methyl methacrylate component should preferably be at least 30 weight percent of the compositions used. The kinds of polymerizable monomers to be used in this case may be selected suitably one or more of them in order to modify properties of the syrup, articles or laminated products as desired.

The α-methylstyrene monomer in polymerizable monomers mentioned above is also available for stabilization of the syrup. Further, the viscosity of the syrup-like compositions of the invention is within the range of 0.1 to 50, preferably, 1 to 25 poises at 25° C. and this viscosity is within a possible range for the manufacture of useful plastic materials and varies largely depending on the kinds, degree of polymerization, and configuration of molecule of the polymer used, so that it is necessary to select the polymer to fit the object.

The above syrup may be shaped and solidified either alone or after being mixed with or permeated to fibrous or textile materials to give resinous products having at least 98% by weight of resein content.

As described hereinbefore, the syrup thus prepared has a viscosity of from 0.1 to 50 poises at 25° C. and high storage-stability. The processing manufacturer can use this syrup as shaping or laminating methacrylate syrup by adding thereto a suitable polymerization initiator.

The syrup of the invention has comparatively lower monomer content which results in low exothermic and shrinkage properties, and can avoid troubles in shaping and laminating processes by adding poly-α-methylstyrene, to control the polymerization rate at the hot hardening stage and to suppress violent heat evolution.

Moreover, poly-α-methylstyrene can usually be manufactured at a lower cost than that of polymethyl methacrylate resins and by mixing it with methyl methacrylate resins the hot softening point can be positively improved without spoiling the desirable properties inherent to methyl methacrylate resin itself, and it enables production of resin compositions at a lower cost. Further, in the case of manufacturing methyl methacrylic resins reinforced by glass fibers, the addition of poly-α-methylstyrene to methacrylic resin gives advantage of having more improved transparency of the shaped articles made of the glass fiber reinforced methacrylate resin than those without poly-α-methylstyrene.

When α-methylstyrene monomer is added as a stabilizer for storage in the syrup of the invention, the amount of addition is preferably within the range of 0.1 to 10% based on the total weight of monomers. The α-methylstyrene monomer added is copolymerized with the methacrylate monomer during the polymerization and hardening step which is carried out at a temperature of from 40 to 160° C. in the presence of polymerization initiator added thereto. Thus, the amount of unpolymerized monomer can be reduced to less than 2% by weight of the polymerized resin. Moreover, the α-methylstyrene incorporated into the polymer not only gives no deteriorative influence to the quality of the product, but it rather improves the softening point of the product positively.

The following examples illustrate the preferred embodiments of the invention for preparing the syrup. The part used therein denotes weight part.

Example 1

20 parts of poly-α-methylstyrene having average polymerization degree of 3,500 was dissolved in a mixture containing 78 parts of methyl methacrylate and 2 parts of α-methylstyrene to provide methacrylate syrup having a viscosity of 1.1 poise at 30° C. The syrup has excellent stability for storage and no substantial increase in its viscosity was recognized after the lapse of 30 days at 30° C.

Example 2

20 parts of poly-α-methylstyrene having polymerization degree of 3,500 and 3 parts of polymethyl methacrylate having polymerization degree of 1,300 were dissolved in a mixture containing 77 parts of methyl methacrylate and 5 parts of α-methylstyrene to give methacrylate syrup having a viscosity of 20 poises at 30° C. with high storage stability. For instance, the change in the viscosity was practically negligible even after the syrup has been left for 30 days at 30° C. On the contrary, the syrup concontaining no α-methylstyrene monomer had solidified after a short period of time and lost its practical value as a syrup. For example, methacrylate syrup comprising 25 parts of polymethyl methacrylate and 75 parts of methyl methacrylate having initial viscosity of 3.2 poises at 30° C. solidified within about ten days while left at 30° C. and its practical utility was limited.

Example 3

The α-methylstyrene and toluene were mixed at a rate of 40:60 weight percent and after perfectly dehydrated and added thereto as catalyst 0.3 to 0.5 weight percent of $BF_3$-$OEt_2$ and 0.6 to 1 weight percent of $CHCl_3$ to polymerize at a temperature of $-10$ to $-40°$ C. and yielded the product having the degree of polymerization of 100 to 1,000 determined by viscosity measurement according to the polymerization temperatures, among which 40 weight parts of poly-α-methylstyrene having the degree of polymerization of 800 was dissolved in 60 weight parts of methyl methacrylate showed the viscosity of 16 poises at 25° C. The syrup was retained for 2 months under room temperature and interrupted light but substantially no change in voscosity could be recognized and showed very good storage stability.

Example 4

The syrup made by dissolving 50 weight parts of poly-α-methylstyrene having degree of polymerization of 200 manufactured by the same method as Example 3 in 50 weight parts of methyl methacrylate showed very excellent storage stability. This syrup added with 0.5 weight part of benzoyl peroxide was impregnated in glass fiber and at a condition that the glass fiber occupies 25 weight percent of the plate of 2.5 mm. in thickness was polymerized in air bath at 80° C., then the polymerization completed in 90 minutes. During this polymerization the variation of the internal temperature was measured by a thermocouple thermometer inserted into the plates, the highest temperature was 90° C. so that it was recognized that the polymerization behavior was entirely different from that of an ordinary process of methacrylic resins and the reinforced plastic plate thus obtained showed the refraction index of 1.549 at 20° C. on D-line and the reinforcing glass filament contained therein become substantially not seen and showed excellent transparency.

Example 5

The syrup made by dissolving 40 weight parts of poly-α-methylstyrene having polymerization degree of 400 manufactured by the same process as Example 3 in 60 weight parts of methyl methacrylate added with 0.4 weight part of azo-bis-isobutyronitrile was impregnated in glass fibers which were polymerized in an air bath at 70° C. by slightly pressing from both sides of the plate of 3 mm. thick under the condition that the glass fibers occupy 40 weight percent, then the polymerization had completed in 120 minutes. During the polymerization the temperature was measured by the same manner as in Example 4 and ascertained that the highest temperature was 87° C. The reinforced plastic plate thus obtained showed apparently superior resistance to discoloration compared with unsaturated polyester laminated product on the market as a result of measurement of discoloration by means of fade-meter and even after exposed to the direct sun light for a long time it never caused fine cracks which occur generally in unsaturated polyester and showed good heat resistance.

Example 6

50 weight parts of poly-α-methylstyrene having polymerization degree of 200 manufactured by the same method as Example 3, 5 weight parts of triallyl cyanurate and 45 weight parts of methyl methacrylate were thoroughly mixed and dissolved with each other to provide a syrup which showed excellent storage stability. To this syrup was added 0.8 weight part of benzoyl peroxide and the mixture was impregnated into glass fibers and polymerized in an air bath at 80° C. and made to a plate of 2.5 mm. thickness under the condition that said glass fiber occupied 25 weight parts and then polymerization was completed in 80 minutes. During this polymerization the change of internaal temperature was measured by a thermocouple inserted into the plates which showed the highest temperature of 87° C., and it was recognized that the polymerization phenomenon was entirely different from that of a conventional methacrylic resins. The reinforced plastic plates thus obtained showed the refraction index of 1.552 and very excellent transparency so that the reinforcing glass fibers contained therein can substantially not be seen.

Example 7

40 weight parts of poly-α-methylstyrene having polymerization degree of 500 manufactured by the same method as Example 3, 53 weight parts of methyl methacrylate and 7 weight parts of diallyl phthalate were mixed to dissolve with each other and obtained a syrup having storage stability. To this syrup was added 0.6 weight part of azo-bis-isobutyronitrile and it was impregnated into glass fibers and the fiber was made to a plate of 3 mm. thickness at a state that the glassfiber occupied 40 weight percent and it was polymerized in an air bath at 70° C. by slightly pressing from both side surfaces, then the polymerization was completed in 105 minutes. During the polymerization the temperature was measured by the same process as in Example 4 and found that it showed the highest temperature of 85° C. The discoloration of the products thus obtained was measured by means of fade-meter and ascertained that this was apparently superior to that of unsaturated polyester laminates available on the market and even if it was exposed to direct sun light for a long time it caused no fined cracks which occur in a conventional unsaturated polyesters and also no swelling up on the surface of glass fibers and had very excellent heat resistance.

Example 8

15 ml. of toluene and 3 g. of potassium (metal) were charged into a flask and heated to 75 to 85° C. to melt metallic potassium, hereupon the content in the flash was violently agitated to make potassium fine powders and 100 ml. of n-hexane were added thereto and cooled to precipitate fine powder of potassium. Then such solvent was taken out of the entire system remaining dried potassium powders in the flask, to which 250 ml. of α-methylstyrene were added and polymerized at room temperature for about 24 hours and yielded a polymer at a conversion of more than 95% and degree of polymerization of the polymer thus obtained was 2,300. The preparation of the above catalyst and the polymerization of the above catalysts were carried out entirely in $N_2$ current. 20 parts of poly-α-methylstyrene thus obtained were dissolved in 80 parts of methyl methacrylate monomer to prepare syrup which had viscosity of 1.1 poise at 30° C. and this syrup showed very good viscosity stability when left at that state. To the syrup was added 0.05 part of benzoyl peroxide and the mixture was poured in a molding cell and after a simple evacuation heated to 60° C. for 10 hours and successively subjected to polymerization at the temperature of 90° C. and 120° C. for each two hours. During this operation no phenomena of polymerization acceleration as occurs usually in conventional methyl methacrylate syrups could not be appreciated and thus very good methyl methacrylate shaped articles without bubbles or cracks were obtained.

Example 9

50 parts of n-hexane, 5 parts of triethyl aluminum, 7 parts of titanium tetrachloride were mixed to provide a polymerization catalyst, to which a mixture of 100 parts of α-methylstyrene and 350 parts of toluene were added at −78° C. and polymerized for about 20 hours. All the above polymerization operations were carried out in the atmosphere of dry nitrogen, thus poly-α-methylstyrene having average degree of polymerization of 3,000 was obtained at the polymerization yield of 95%.

20 parts of poly-α-methylstyrene thus obtained were dissolved in a mixture consisting of 64 parts of methyl methacrylate monomer and 16 parts of dimethyl itaconate monomer, then adding to said syrup 0.08 parts of benzoyl peroxide and poured into a mold and after reducing pressure and evacuation it was subjected to heating polymerization and solidified at 60° C. for 10 hours, then at 90° C. and 120° C. respectively for each 3 hours, thus a transparent and beautiful methyl methacrylate shaped article having no bubbles and cracks was obtained.

Example 10

To a mixture consisting of 450 parts of tetrahydrofuran, 0.8 part of butyllithium were added 50 parts of α-methylstyrene and polymerized in nitrogen atmosphere at −50° C. for about 18 hours. The polymerization yield was 85%. The average degree of polymerization of polymers thus obtained was 800. 20 parts of poly-α-methylstyrene thus obtained were dissolved in 80 parts of methyl methacrylate to prvoide a syrup which showed good storage stability while left at that state. To the syrup was added 0.02 part of benzoyl peroxide and the mixture was poured into a molding cell and after reducing pressure and evacuation it was heated, polymerized and solidified at 80° C. for 25 hours, then at 120° C. for 2 hours, thus a transparent beautiful methyl methacrylate resin shaped article having no bubbles and cracks was obtained.

Example 11

15 parts of poly-α-methylstyrene polymer having average degree of polymerization of 3,500 manufactured by the cation polymerization using boron trifluoride etherate catalyst were dissolved in 85 parts of methyl methacrylate monomer to prepare a syrup which had viscosity of 1.1 poises at 30° C. and showed improved viscosity stability when left at that state. To this syrup was added 0.05 part of benzoyl peroxide and poured into a molding cell and after simple evacuation it was heated and polymerized at 60° C. for 10 hours, succeedingly at 90° C. and 120° C. for each 2 hours. During which there occurred no phenomenon of polymerization acceleration which inevitably occurred in heretofore usual methyl methacrylate syrups and thus yielded methyl methacrylate articles having improved properties without air bubbles and cracks. The non-polymerized monomer contained in the polymer resin thus obtained was less than 0.5 weight percent.

Example 12

15 parts of poly-α-methylstyrene having average degree of polymerization of 2,000 manufactured by cation polymerization were dissolved in 85 parts of methyl methacrylate to provide a syrup which had good storage stability while it was left at that state. To this syrup was added 0.02 part of benzoyl peroxide and poured into a molding cell and after reduced pressure and evacuation it was heated to 80° C. for 2.5 hours, then at 120° C. for 2 hours to polymerize and solidify. Thus, a transparent and beautiful methyl methacrylate resinous article having less than 0.1% of non-polymerized monomer and without bubbles and cracks was obtained.

Example 13

20 parts of copolymer ($[\eta]$ in toluene at 30° C. was 1.457 (dl./g.)) consisting of 90% of α-methylstyrene and 10% of styrene were dissolved in 80 parts of methyl methacrylate and added thereto 0.05 part of benzoyl peroxide to prepare a methyl methacrylate syrup. This syrup was polymerized together with glass fibers to solidify and manufactured a reinforced methyl methacrylate resinous article having heat resistance and excellent transparency. When the syrup alone was polymerized and solidified without adding any reinforcing materials such as glass fibers a methyl methacrylate resinous shaped article having excellent heat resistance was obtained.

Example 14

To a mixture consisting of 450 parts of tetrahydrofuran and 0.8 part of butyllithium were added 50 parts of α-methylstyrene and polymerized in nitrogen atmosphere at −50° C. for about 18 hours. The polymerization construction was 94% and the degree of polymerization of polymer thus obtained was 300. 50 parts of poly-α-methylstyrene thus obtained, 5 parts of triallyl cyanate and 45 parts of methyl methacrylate monomer were thoroughly mixed to dissolve with each other to produce a syrup which showed excellent storage stability and polymerizing and solidifying in the similar method as in Examples 3 to 8 a transparent shaped article having no bubbles and cracks was obtained.

Example 15

20 parts of α-methylstyrene polymer having average degree of polymerization 3,000 manufactured by coordination polymerization together with 5 parts of polymethyl methacrylate having average degree of polymerization 1,300 were dissolved in 75 parts of methyl methacrylate monomer to produce a methyl methacrylate syrup which had viscosity of 16 poises at 25° C. and to this syrup was added 0.08 part of benzoyl peroxide to produce a methyl methacrylate syrup which was polymerized together with reinforcing materials such as glass fiber to solidify and obtained reinforced methyl methacrylate resinous article having excellent heat resistance and transparency.

Example 16

20 parts of α-methylstyrene having average degree of polymerization of 3,500 manufactured by the cation polymerization were dissolved in a mixture consisting of 64 parts of methyl methacrylate monomer and 16 parts of dimethyl itaconate to provide a syrup. The syrup composition had viscosity of 1.6 poises at 25° C. and excellent storage stability. Next, to this syrup was added 0.08 part of benzoyl peroxide and the mixture was poured into a mold and after reduced pressure and evacuation it was heated and polymerized to solidify at 60° C. for 10 hours, then 90° C. and 120° C. for each 3 hours, thus a transparent beautiful methyl methacrylate article having no bubbles and cracks was obtained.

Example 17

25 parts of poly-α-methylstyrene having degree of polymerization of 3,000 manufactured by cation polymerization and 5 parts of polymethyl methacrylate having average degree of polymerization of 1,300 were dissolved in 70 parts of methyl methacrylate to provide methyl methacrylate syrup which had viscosity of 30 poises at 25° C. and excellent storage stability. To this syrup was added 0.08 part of benzoyl peroxide to provide methyl methacrylate syrup and this syrup was polymerized to solidify together with reinforcing materials such as glass fibers and methyl methacrylate resinous article having excellent heat resistance and transparency was provided.

*Example 18*

20 parts of poly-α-methylstyrene having polymerization degree of 2,000 manufactured by cation polymerization were dissolved in a mixed solution consisting of 70 parts of methyl methacrylate monomer and 10 parts of allyl methyl methacrylate monomer to provide methyl methacrylate syrup which had viscosity of 1.2 poises at 25° C. To this syrup was added 0.05 part of 2.2'-azo-bis-isobutyronitrile and polymerized to solidify at 60° C. for 8 hours, then at 90° C. and 120° C. for each 2 hours. During the polymerization there occurred no remarkable acceleration phenomena on the polymerization rate and improved methyl methacrylate resinous article having no bubbles and cracks was obtained.

The methyl methacrylate syrup of the invention having good storage stability may be polymerized by adding thereto a polymerization initiator in similar manners known, per se, in the art of producing methyl methacrylate resin or polyester laminates.

The syrup of the invention can be used either solely or in mixture with any other reinforcing materials and/or inert additives such as glass fiber, natural and synthetic fiber, metal powder, pigments fillers, coloring materials and the like.

The shaping of this syrup can be performed in a suitable mold at a temperature ranging from room temperature to 160° C. The polymerization under low pressure sometimes requires evacuation of gases from the syrup before it is used.

What we claim is:

1. A methyl methacrylate syrup composition characterized by high storage stability, adapted and arranged for preparation of shaped articles and laminated products, comprising a syrup containing a minor proportion of α-methylstyrene polymer dissolved in at least 30% by weight of methyl methacrylate monomer based on the weight of the syrup, said syrup having a viscosity of between 0.1 and 50 poises at 25° C.

2. The methyl methacrylate syrup composition of claim 1 containing up to 16% by weight of an unsaturated monomer selected from the group consisting of allyl methacrylate, dimethyl itaconate, diallyl phthalate and triallyl cyanurate.

3. The methyl methacrylate syrup composition of claim 1 containing 0.1 to 10% by weight of α-methylstyrene, monomer based on the weight of the total weight of monomer.

4. The methyl methacrylate syrup composition of claim 1 wherein the α-methylstyrene polymer is α-methylstyrene homopolymer having degree of polymerization of 100 to 3,500.

5. A methyl methacrylate syrup composition characterized by high storage stability, adapted and arranged for preparation of shaped articles and laminated products, comprising a syrup containing 15 to 50% by weight of α-methylstyrene homopolymer having a degree of polymerization of 100 to 3,500 dissolved in 85 to 50% by weight of methyl methacrylate monomer.

6. In the process of preparing reinforced resinous articles having superior transparency and weather resistance, the steps which comprise impregnating a reinforcing material with a syrup containing a minor proportion of α-methylstyrene polymer dissolved in at least 30% by weight of methyl methacrylate monomer based on the weight of the syrup, the syrup having a viscosity of between 0.1 and 50 poises at 25° C., and subjecting thus impregnated material to polymerization to effect polymerization of monomeric component present in the impregnated material.

References Cited by the Examiner

UNITED STATES PATENTS

| 2,326,543 | 7/1940 | Macht | 260—901 |
| 3,070,574 | 12/1962 | Kastning et al. | 260—886 |
| 3,189,665 | 6/1965 | Nozaki | 260—885 |

FOREIGN PATENTS

| 147,880 | 8/1952 | Australia. |
| 569,684 | 6/1945 | Great Britain. |
| 856,581 | 12/1960 | Great Britain. |
| 627,391 | 12/1961 | Canada. |

MURRAY TILLMAN, *Primary Examiner.*

J. T. GOOLKASIAN, *Assistant Examiner.*